United States Patent [19]
Olshansky

[11] Patent Number: 5,301,058
[45] Date of Patent: * Apr. 5, 1994

[54] SINGLE SIDEBAND OPTICAL MODULATOR FOR LIGHTWAVE SYSTEMS

[75] Inventor: Robert Olshansky, Wayland, Mass.

[73] Assignee: GTE Laboratories Incorporated, Waltham, Mass.

[ * ] Notice: The portion of the term of this patent subsequent to Mar. 31, 2009 has been disclaimed.

[21] Appl. No.: 636,644

[22] Filed: Dec. 31, 1990

[51] Int. Cl.$^5$ .......................................... H04B 10/04
[52] U.S. Cl. .................................. 359/188; 359/181; 359/246; 359/254; 385/3
[58] Field of Search .............................. 359/124–125, 359/127–128, 133, 132, 183, 180–181, 188, 249, 245–246, 254, 179; 385/3

[56] References Cited

U.S. PATENT DOCUMENTS

| | | | |
|---|---|---|---|
| 4,291,939 | 9/1981 | Giallorenzi | 359/245 |
| 4,502,037 | 2/1985 | Le Parquier | 385/3 |
| 4,694,276 | 9/1987 | Rastegar | 385/3 |
| 4,769,853 | 9/1988 | Goodwin | 385/183 |
| 4,856,094 | 8/1989 | Heidrich | 385/190 |
| 4,893,352 | 1/1990 | Welford | 385/191 |
| 5,031,235 | 7/1991 | Raskin | 359/125 |
| 5,074,631 | 12/1991 | Hamano | 385/3 |
| 5,101,450 | 3/1992 | Olshansky | 359/127 |

FOREIGN PATENT DOCUMENTS

| | | |
|---|---|---|
| 0387832 | 1/1986 | European Pat. Off. . |
| 0168914 | 9/1990 | European Pat. Off. . |
| 62-43231 | of 1987 | Japan ............... H04B 9/00 |
| 2131567 | 6/1984 | United Kingdom . |

OTHER PUBLICATIONS

Lin, "Reduction of Intermodulation Distortion of Interferometric Optical Modulators through Incoherent Mixing of Optical Waves", Electronic Letters, vol. 26, No. 23, pp. 1980–1982, Nov. 8, 1990.

R. Olshansky et al., 60-Channel FM Video Subcarrier Multiplexed Optical Communication System, Electronics Letters, vol. 23, No. 22, pp. 1196–1198, Oct. 1987.

Alferness, Guided-Wave Devices for Optical Communication, IEEE Journal of Quantum Electronics, vol. QE-17, No. 6, Jun. 1981, pp. 946–959.

N. Takato et al, Silica-Based Integrated Optic Mach-Zehnder Multi-Demultiplexer Family with Channel Spacing of 0.01–250 nm, IEEE Journal of Selected Areas of Communication, vol. 8, pp. 1120–1127, Aug. 1990.

J. Stone et al., Pigtailed High Finesse Tunable Fiber Fabry-Perot Interferometers with Large, Medium and Small Free Spectral Ranges, Electronics Letters, vol. 23, pp. 781–783, 1987.

H. Soda et al., Stability in Single Longitudinal Mode Operation in GaInAsP/InP Phase-Adjusted DFB Lasers, IEEE J. Quantum Electronics, vol. QE-23, Jun. 1987, pp. 804–814.

Derr, Optical QPSK Homodyne Transmission of 280 Mbit/s, Electronics Letters, vol. 26, No. 6, pp. 401–403.

Primary Examiner—Leslie Pascal
Attorney, Agent, or Firm—Lawrence E. Monks

[57] ABSTRACT

Optical communication methods and apparatus are disclosed for transmitting two or more optical signals with different optical carrier frequencies on a single optical fiber with high spectral efficiency. Each optical carrier is typically modulated with multiple modulated subcarriers. In one embodiment, an optical phase modulator provides cancellation of second order intermodulation products in each optical signal, thereby permitting the optical carrier frequencies to be spaced by $2f_{max}$, where $f_{max}$ is the maximum modulation frequency. In another embodiment, a single sideband optical phase modulator provides cancellation of second order intermodulation products and one signal sideband, thereby permitting the optical carrier frequencies to be spaced by $f_{max}$.

25 Claims, 10 Drawing Sheets

SINGLE SIDEBAND OPTICAL MODULATOR FOR LIGHTWAVE SYSTEMS

FIELD OF THE INVENTION

This invention relates to optical communication systems wherein two or more modulated optical carriers are transmitted over a single optical fiber and, more particularly, to a single sideband optical phase modulator and to optical communication systems utilizing the single sideband modulator.

BACKGROUND OF THE INVENTION

Optical fiber transmission systems are being extensively used in the telephone network for long distance and interoffice trunk lines because of their wide bandwidth, small size and insensitivity to electrical interference. Conventional long distance optical transmission systems utilize time division multiplexed digital transmission. The maximum data rate available in commercial lightwave systems was for many years limited to 565 megabits per second, and has only recently been increased to 1.7 gigabits per second. A 565 megabits per second optical trunk line carrying 8000 voice channels is very cost effective for voice transmission.

Recently, efforts have been made in the telecommunications industry to utilize optical transmission systems in the local, or subscriber, loop between the central office and individual subscribers. The goal is to provide not only voice, but also data and video transmission over the optical fiber to every home and business. The video services are expected to include not only broadcast services but also switched video services which will enable each subscriber to select programming and movies from video libraries. An uncompressed digital video signal requires a data rate of about 100 megabits per second, and analog FM video requires a bandwidth of about 30 MHz. The 565 megabits per second system can carry only a few video channels.

Increased transmission bandwidth can be realized with coherent optical systems using multiple modulated optical carriers which are closely spaced in frequency. Coherent systems with multiple optical carriers have been disclosed by Shikada in "Multiplex Transmitting Method for Optical Heterodyne/Homodyne Detection Wavelength", Japanese patent publication No. 62-43231, 1987. In the Shikada system, one information channel is transmitted on each optical carrier, but N optical carriers can be utilized.

Subcarrier multiplexed (SCM) optical communication systems have also been proposed as a means for providing increased transmission bandwidth. A wideband signal composed of many frequency multiplexed carriers at either RF or microwave frequencies is used to modulate an optical carrier. The optical signal is transmitted through a conventional single mode optical fiber to a remote location. The optical signal received at the remote location is detected with a high speed photodiode, and the transmitted signals are recovered with a conventional RF or microwave receiver. The RF or microwave carriers can be modulated by either analog or digital signals and can be used to carry voice, data, video, digital audio and high definition video, in almost any combination of services.

Transmission of 60 frequency modulated video channels over 18 kilometers of optical fiber is described by R. Olshansky et al in "60-Channel FM Video Subcarrier Multiplexed Optical Communication System", *Electronics Letters*, Vol. 23, No. 22, pages 1196–1198, October 1987. A coherent subcarrier multiplexed optical communication system is disclosed in pending application Ser. No. 07/289,009 filed Dec. 22, 1988. In the diclosed coherent SCM system, M information channels can be transmitted on an optical carrier by using M subcarriers, each individually modulated with a separate information signal. By combining the above techniques, M information channels can be carried on each of N optical carriers for a total of M×N information channels.

A drawback of an SCM system with multiple optical carriers is that each modulated optical carrier has upper and lower sidebands and also contains second order intermodulation products which fall outside the upper and lower sidebands. To prevent interference between adjacent optical channels, it is necessary to provide a frequency separation between optical carriers of $3f_{max}$, where $f_{max}$ is the maximum subcarrier frequency used to modulate the optical carrier. In order to maximize the transmission bandwidth, it is desirable to achieve close spacing between optical carriers, while minimizing interference.

It is a general object of the present invention to provide improved optical communication systems.

It is another object of the present invention to provide optical communication systems having a very large information-carrying capability.

It is a further object of the present invention to provide a single sideband optical modulator.

It is yet another object of the present invention to provide optical communication systems having a small spectral spacing between adjacent optical carriers.

It is a further object of the present invention to provide coherent optical communication systems wherein the spectral spacing between adjacent optical carriers is not substantially greater than the maximum modulation frequency.

SUMMARY OF THE INVENTION

According to the present invention, these and other objects and advantages are achieved in a single sideband optical phase modulator comprising a first intermod-cancelling optical phase modulator having an input for receiving an optical carrier and an output for providing a first modulated optical carrier, a second intermod-cancelling optical phase modulator having an input for receiving an optical carrier and an output for providing a second modulated optical carrier, an input optical divider for coherently coupling an input optical carrier to the first and second intermod-cancelling optical phase modulators, an output optical combiner for coherently combining the first and second modulated optical carriers and providing an output optical signal, and modulation means for providing a first modulation signal $v_s(t)$ to the first intermod-cancelling optical phase modulator and for providing a second modulation signal $v_c(t)$ to the second intermod-cancelling optical phase modulator, the first modulation signal and the second modulation signal being selected such that the output optical signal has only a single sideband.

Each intermod-cancelling optical phase modulator comprises first and second optical waveguides, first and second electrodes for phase modulating lightwaves carried in the first and second optical waveguides, respectively, an optical divider for coherently coupling the optical carrier to the first and second optical waveguides, an optical combiner for coherently combining optical signals from the first and second optical waveguides and providing a modulated optical signal, and a signal conditioner responsive to the modulation signal for providing first and second electrode signals to the first and second electrodes, respectively.

The first modulation signal is typically of the form $$v_s(t) = \Sigma \beta_i \sin(\omega_i t + \delta_i)$$

where $\beta_i$ = amplitude of the ith subcarrier,
$\omega_i$ = frequency of the ith subcarrier, and
$\delta_i$ = phase of the ith subcarrier, and the second modulation signal is typically of the form $$v_c(t) = \Sigma \beta_i \cos(\omega_i t + \delta_i) - v_{\pi/2}$$

where $v_{90/2}$ = voltage required to produce a phase shift of $\pi/2$ at the optical carrier frequency. The amplitude $\beta_i$, the frequency $\omega_i$ or the phase $\delta_i$ of each subcarrier can be modulated with an information signal $S_i$. One of the sidebands and second-order intermodulation products are cancelled in the output of the single sideband optical phase modulator. As a result, optical channels can be spaced by a frequency $f_{max}$, where $f_{max}$ represents the maximum modulation frequency.

According to another aspect of the invention, an optical transmitter comprises a plurality of optical signal sources for generating optical signals comprising modulated optical carriers at different optical carrier frequencies. Each of the optical signal sources comprises a laser for generating an optical carrier, a single sideband optical phase modulator coupled to the output of the laser, and modulation means for providing first and second modulation signals to the single sideband modulator for modulating the optical carrier, the first and second modulation signals being selected such that an output optical signal from the single sideband modulator has only a single sideband. The optical transmitter further includes means for coupling the output optical signals from the optical signal sources to an optical waveguide for transmission, each optical signal having only a single sideband so that the optical carrier frequencies can be closely spaced. Each single sideband optical phase modulator is constructed as described above.

According to yet another aspect of the invention, a single sideband optical intensity modulator comprises a single sideband optical phase modulator having an input for receiving an optical carrier and an output for providing a modulated optical carrier, an optical waveguide section, an input optical divider for coherently coupling an input optical carrier to the single sideband optical phase modulator and to an input of the optical waveguide section, an output optical combiner for coherently combining the output of the single sideband optical phase modulator and the output of the optical waveguide section and providing an output optical signal, and modulation means for providing first and second modulation signals to the single sideband optical phase modulator, the first and second modulation signals being selected such that the modulated optical carrier has only a single sideband. The single sideband optical phase modulator is constructed as described above.

According to a further aspect of the invention, a single sideband optical phase modulator comprises first and second optical waveguides, first and second electrodes positioned for a phase modulating lightwaves carried in the first and second optical waveguides, respectively, an optical divider for coherently coupling an optical carrier to the first and second optical waveguides, an optical combiner for coherently combining modulated optical carriers from the first and second optical waveguides and providing an output optical signal, and modulation means for providing a first modulation signal $v_s(t)$ to the first electrode and for providing a second modulation signal $v_c(t)$ to the second electrode, the first and second modulation signals being selected such that the output optical signal has only a single sideband. The modulation signals $v_s(t)$ and $v_c(t)$ are typically of the form discussed above. In this embodiment of the single sideband optical phase modulator, the output optical signal contains second-order intermodulation products. Therefore, this embodiment is useful when second order intermodulation products are relatively small.

BRIEF DESCRIPTION OF THE DRAWINGS

For a better understanding of the present invention, together with other and further objects, advantages and capabilities thereof, reference is made to the accompanying drawings which are incorporated herein by reference and in which.

DETAILED DESCRIPTION OF THE INVENTION

Figure 1:
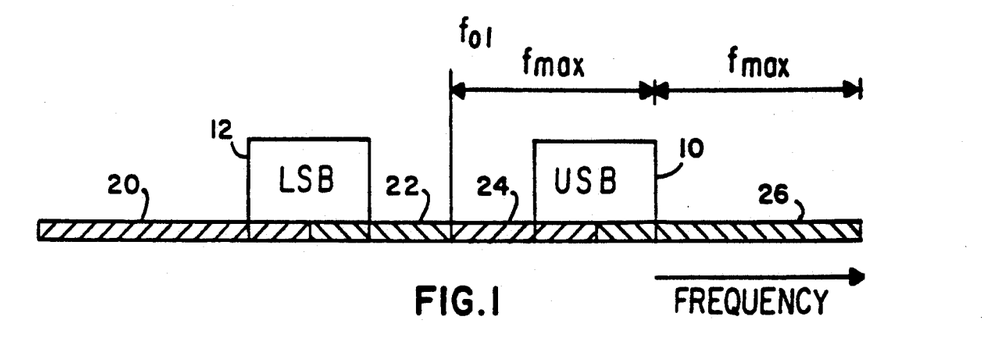
FIG. 1 is a spectral diagram of an optical carrier that is modulated with multiple subcarriers.

A spectral diagram of a subcarrier multiplexed (SCM) system is shown in FIG. 1. Spectral intensity is plotted as a function of frequency. An optical carrier at a frequency $f_{01}$ is modulated with multiple subcarriers. The modulation voltage v(t) is given by $$v(t) = \Sigma \beta_i \cos(\omega_i t + \delta_i) \tag{1}$$

where $\beta_i$ = amplitude of the ith subcarrier, $\omega_i$ = frequency of the ith subcarrier, and $\delta_i$ = phase of the ith subcarrier. The information signal can be contained in a time-varying amplitude $\beta_i$, a time-varying frequency $\omega_i$ or a time varying phase $\delta_i$ of each subcarrier. The spectrum as shown in FIG. 1 includes an upper sideband 10 and a lower sideband 12 equally spaced from the optical carrier. In addition, the spectrum includes four bands containing second order intermodulation products (IMP's). Band 20 includes second order IMP's at frequencies $f_{01} - (f_i + f_j)$; band 22 contains second order IMP's at frequencies $f_{01} - (f_i - f_j)$; band 24 contains second order IMP's at frequencies $f_{01} + (f_i - f_j)$; and band 26 contains second order IMP's at frequencies $f_{01} + (f_i + f_j)$, where $f_i$ and $f_j$ represent different subcarrier frequencies.

Figure 2:
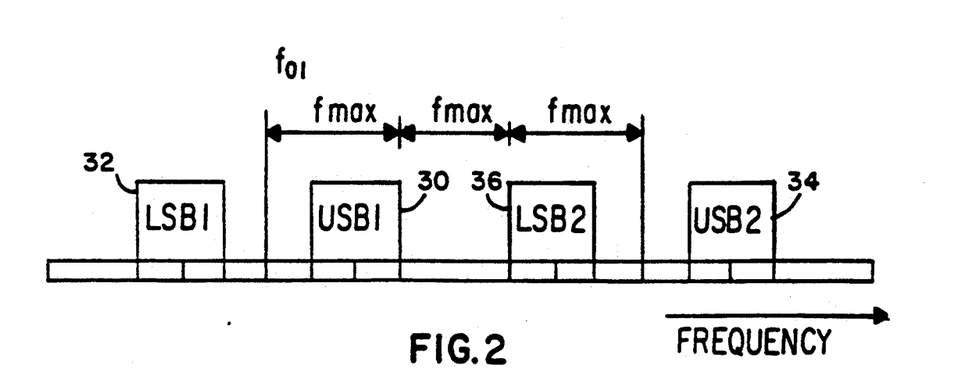
FIG. 2 is a spectral diagram which shows the minimum spacing between optical carriers that are modulated with multiple subcarriers in accordance with the prior art.

As shown in FIG. 1, band 26 extends higher in frequency than upper sideband 10, and band 20 extends lower in frequency than lower sideband 12. As a result, in optical communication systems utilizing two or more subcarrier multiplexed optical carriers, it has heretofore been necessary to space optical carriers as shown in FIG. 2 to avoid interference from second order IMP's. A spectral diagram of a system including two modulated optical carriers is shown in FIG. 2. A first optical channel includes an upper sideband 30 and a lower sideband 32. A second optical channel includes an upper sideband 34 and a lower sideband 36. In order to prevent second order IMP's from the first optical channel from interfering with lower sideband 36, and to prevent second order IMP's from the second optical channel from interfering with upper sideband 30, it is necessary to space upper sideband 30 from lower sideband 36 by a frequency $f_{max}$, where $f_{max}$ is the maximum modulation frequency. Therefore, the minimum spacing between optical carriers is $3f_{max}$. This spacing between optical channels does not provide an efficient utilization of the available spectrum.

Figure 3:
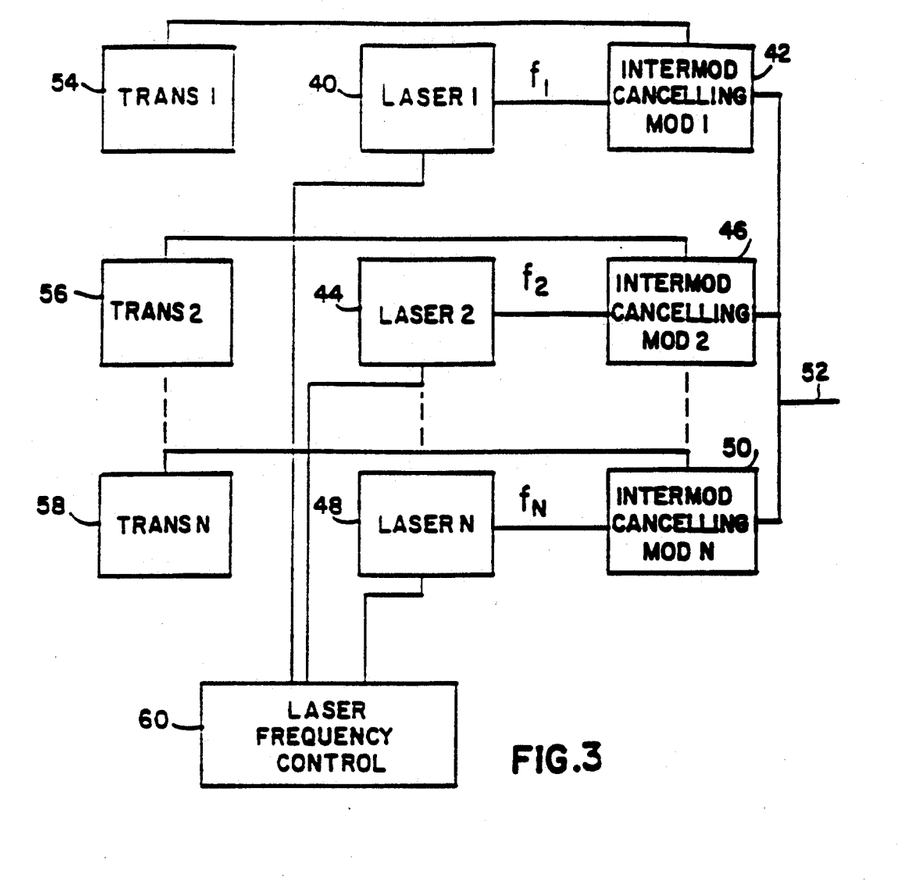
FIG. 3 is a block diagram of an optical transmitter in accordance with the invention, wherein second order intermodulation products are cancelled.

A block diagram of an optical transmitter wherein second order IMP's are cancelled is shown in FIG. 3. By cancelling second order IMP's, closer spacing between optical carriers can be utilized as described hereinafter. A first laser 40 directs an optical carrier at a first frequency $f_1$ to an intermod-cancelling (IC) optical phase modulator 42. A second laser 44 directs an optical carrier at a second optical frequency $f_2$ to an IC optical phase modulator 46. An Nth laser 48 directs an optical carrier at an Nth optical frequency $f_N$ to an IC optical phase modulator 50. The number N of lasers and IC modulators in the system depends on the number of modulated optical carriers to be transmitted. The outputs of modulators 42, 46---50 are connected to an optical fiber 52 for transmission of a composite optical signal to one or more remote locations. An electrical transmitter 54 provides a modulation signal to modulator 42; an electrical transmitter 56 provides a modulation signal to modulator 46; and an electrical transmitter 58 provides a modulation signal to modulator 50.

The lasers 40, 44---48 can, for example, be distributed feedback semiconductor lasers as described by H. Soda et al in "Stability in Single Longitudinal Mode Operation in GaInAsP/InP Phase-Adjusted DFB Lasers", *IEEE J. Quantum Electronics*, Vol. QE 23, June 1987, pages 804–814. A laser control 60 provides to the lasers 40, 44---48 signals which control the optical frequencies of each laser so as to permit close optical carrier frequency spacing.

Figure 4:
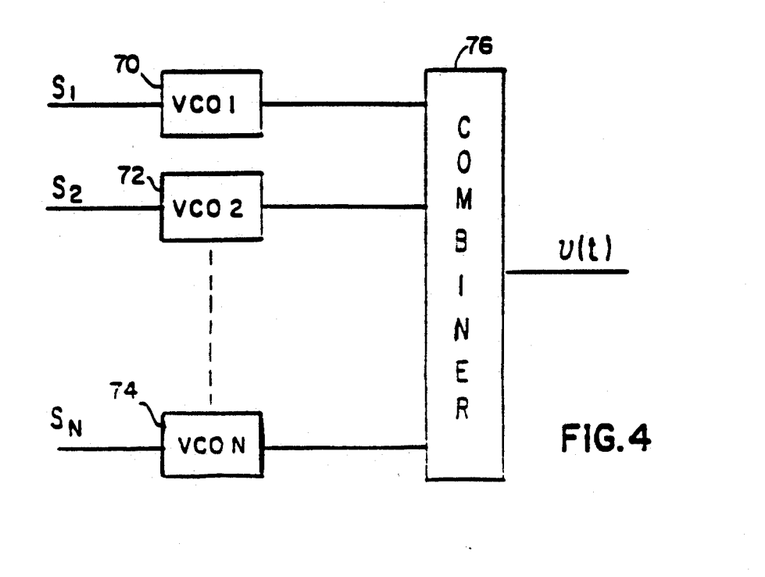
FIG. 4 is a block diagram of an electrical transmitter used in the optical transmitter of FIG. 3.

A block diagram of an electrical transmitter representative of transmitters 54, 56---58 is shown in FIG. 4. A first information carrying signal $S_1$ modulates a voltage controlled oscillator (VCO) 70. A second information carrying signal $S_2$ modulates a VCO 72 and an Nth information carrying signal $S_N$ modulates a VCO 74. The signals $S_1$, $S_2$---$S_N$ can be any signal to be transmitted, such as a digital signal, a voice signal, an audio signal or a video signal. The signals $S_i$, $S_2$---$S_N$ produce frequency modulation of the subcarriers generated by the VCO's 70, 72---74. The VCO's 70, 72---74 have different frequencies in the electrical frequency spectrum, typically in the range from about 0 to 20 GHz. The maximum modulation frequency $f_{max}$ is determined by the 3dB bandwidth of the IC optical phase modulators. The outputs of VCO's 70, 72---74 are connected to the inputs of an electrical power combiner 76. The output of combiner 76, which has the form of the modulation signal of equation (1), is connected to the modulation input of one of the modulators 42, 46---50 shown in FIG. 3. The electrical transmitter utilized in the optical transmitter of FIG. 3 can have different configurations within the scope of the present invention. For example, the VCO's shown in FIG. 4 can be replaced with fixed frequency oscillators and modulators which receive the information carrying signals. This configuration produces phase modulation of the subcarriers.

Figure 5:
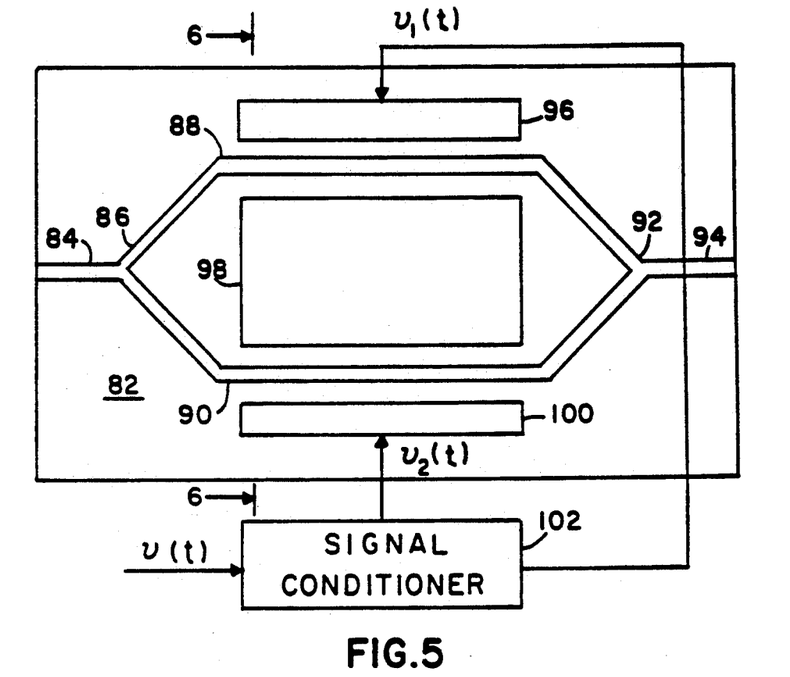
FIG. 5 is a schematic diagram of a lumped-element intermod-cancelling optical phase modulator that can be used in the optical transmitter of FIG. 3.
Figure 6:
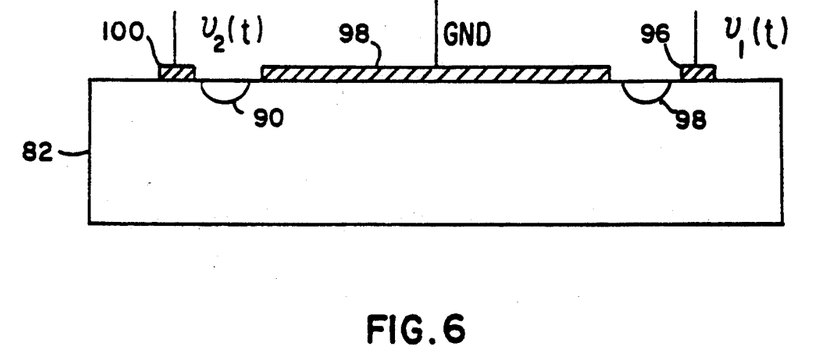
FIG. 6 is a partial cross-sectional view of the intermod-cancelling optical phase modulator shown in FIG. 5.

The details of an optical phase modulator representative of modulators 42, 46---50 are shown in FIGS. 5 and 6. Since the optical modulator shown in FIG. 5 cancels second order intermodulation products, it is referred to herein as an "intermod-cancelling" optical phase modulator. The modulator of the present invention is a variation of a Mach-Zehnder modulator, or Y-branch interferometric modulator, as disclosed by Alferness in "Guided-Wave Devices for Optical Communication", *IEEE Journal of Quantum Electronics*, Vol. QE-17, No. 6, June 1981, pages 946-959. The modulator includes an optical waveguide 80 formed on a substrate 82. Typically, the substrate 82 is lithium niobate, and the waveguide 80 is made with in-diffused titanium. However, other substrate and waveguide materials are included within the scope of the present invention. The optical waveguide 80 includes an input section 84, an optical divider 86, a first modulation section 88, a second modulation section 90, an optical combiner 92 and an output section 94. The optical divider 86 divides the optical carrier received on input section 84 and coherently couples approximately 50% of the optical carrier power to one end of each of the modulation sections 88 and 90. The other ends of the modulation sections 88 and 90 are connected to the optical combiner 92. The optical combiner 92 coherently combines the optical signals from modulation sections 88 and 90 in equal proportions and provides an output optical signal on output section 94.

The modulation sections 88 and 90 are typically elongated, parallel, spaced apart waveguide sections. An electrode 96 is positioned along one side of modulation section 88, and an electrode 100 is positioned along one side of modulation section 90. A common electrode 98 is positioned along the other side of each of modulation sections 88 and 90. As shown in FIG. 6, the electrodes 96, 98 and 100 can be metallizations on the surface of substrate 82.

The common electrode 98 is typically connected to ground, and modulation signal voltages are applied to electrodes 96 and 100. A modulation voltage applied between electrode 96 and electrode 98 produces an electric field in optical waveguide modulation section 88. A modulation voltage applied between electrode 100 and electrode 98 produces an electric field in optical waveguide modulation section 90. The electric fields in turn modulate the refractive indices of the optical waveguide modulation sections 88 and 90 and phase modulate the lightwaves carried therein.

Figure 5A:
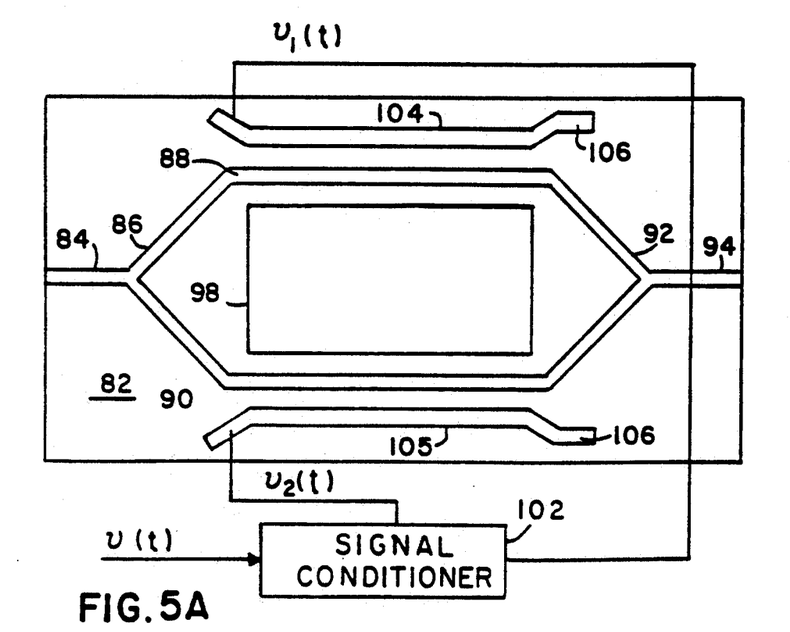
FIG. 5A is a schematic diagram of a traveling wave intermod-cancelling optical phase modulator that can be used in the optical transmitter of FIG. 3.

The optical phase modulator shown in FIG. 5 utilizes lumped-element electrodes 96 and 100. The bandwidth of lumped-element modulators is limited to several GHz, while traveling wave modulators can have bandwidths of 10–40 GHz. An intermod-cancelling optical phase modulator with traveling wave electrodes is shown in FIG. 5A. Corresponding elements in FIGS. 5 and 5A have the same reference numerals. A traveling wave electrode 104 is positioned along one side of modulation section 88, and a traveling wave electrode 105 is positioned along one side of modulation section 90. The electrodes 104 and 105 each have a 50 ohm termination 106. The electrodes 104 and 105 are designed as transmission lines matched to the input cable, and the modulation signals $v_1(t)$ and $v_2(t)$ are fed colinearly with the propagating optical waves. Traveling wave optical phase modulators are described in the aforementioned Alferness paper.

Figure 6A:
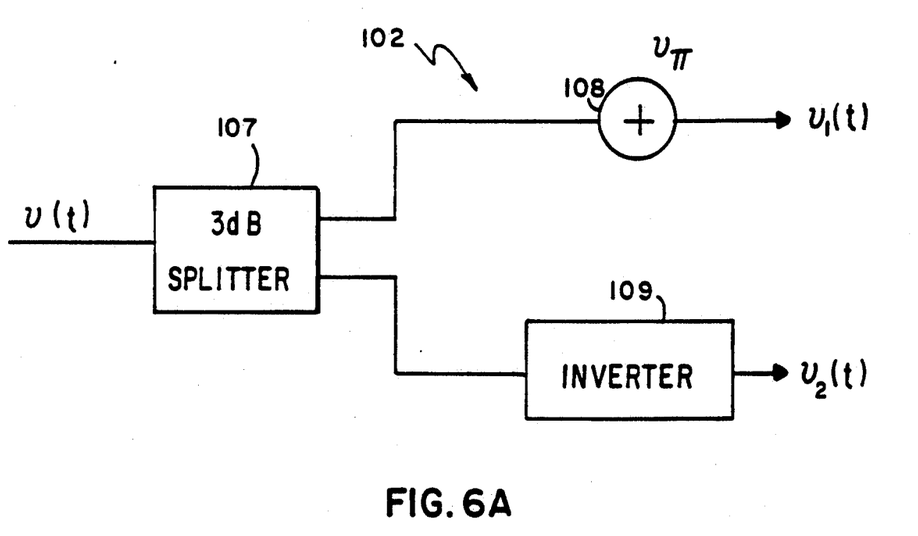
FIG. 6A is a block diagram of the signal conditioner shown in FIGS. 5 and 5A.

The modulation signal v(t) as given by equation (1) and generated by the RF transmitter shown in FIG. 4 is applied to a signal conditioner 102. The signal conditioner 102 generates a first signal $v_1(t)$ which is applied to electrode 96 (FIG. 5) or electrode 104 (FIG. 5A) and a second signal $v_2(t)$ which is applied to electrode 100 (FIG. 5) or electrode 105 (FIG. 5A). The modulation signals $v_1(t)$ and $v_2(t)$ are given as follows:

$$v_1(t) = \Sigma \beta_i \cos(\omega_i t + \delta_i) + v_\pi \quad (2)$$

$$v_2(t) = -\Sigma \beta_i \cos(\omega_i t + \delta_i) \quad (3)$$

where $v_\pi$ = a voltage which produces a phase shift of $\pi$ at the optical carrier frequency. The signal conditioner 102 can comprise a 3dB splitter 107 followed by a voltage inverter 108 on the branch that supplies $v_2(t)$ and an adder 109 for adding a DC bias of $v_\pi$ on the branch that supplies $v_1(t)$, as shown in FIG. 6A.

The optical carrier applied to input section 84 is given by:

$$E(t) = E_0 \cos(\omega_0 t) \quad (4)$$

where $E_0$ = amplitude of the optical carrier and $\omega_0$ = frequency of the optical carrier. The optical signal on output section 94 after modulation of the optical carrier by modulation signals $v_1$ and $v_2$ is given by:

$$e(t) = \sqrt{2} E_0 \sin(\omega_0 t) \sin\phi \quad (5)$$

where $\phi = \pi v(t)/v_\pi$. The optical signal given by equation (5) is free of second order intermodulation products.

A coherent optical receiver suitable for receiving the optical signal transmitted on optical fiber 52 by the optical transmitter shown in FIG. 3 and described above, is shown in FIG. 7. The received signal on optical fiber 52 is connected to one input of an optical fiber coupler 110. The output of a tunable local oscillator laser 112 is connected to another input of fiber coupler 110. The received signal and the output of local oscillator laser 112 are combined by fiber coupler 110, and the combined signal is applied to a wideband photodetector 114, which can be a PIN photodiode. The output of photodetector 114 is connected to the input of an electrical receiver 116. Further details regarding a coherent subcarrier multiplexed optical communication receiver are disclosed in pending application Ser. No. 07/289,009 filed Dec. 22, 1988, which is hereby incorporated by reference.

Figure 7:
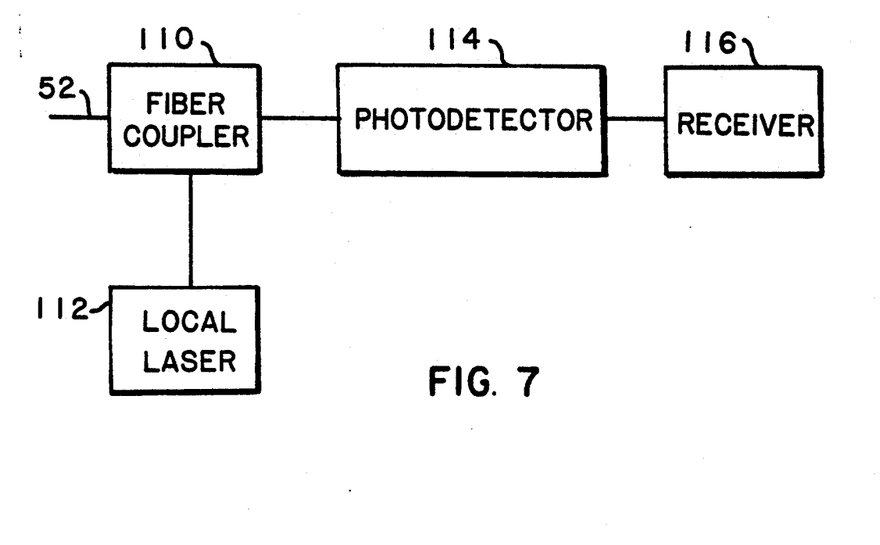
FIG. 7 is a block diagram of a coherent optical receiver suitable for use with the optical transmitter of FIG. 3.

In operation, the frequency of the local oscillator 112 laser is tuned to select a desired optical carrier The intermediate frequency output of photodetector 114 is processed by receiver 116 to select a desired channel from the SCM channels carried on the optical carrier.

Figure 8:
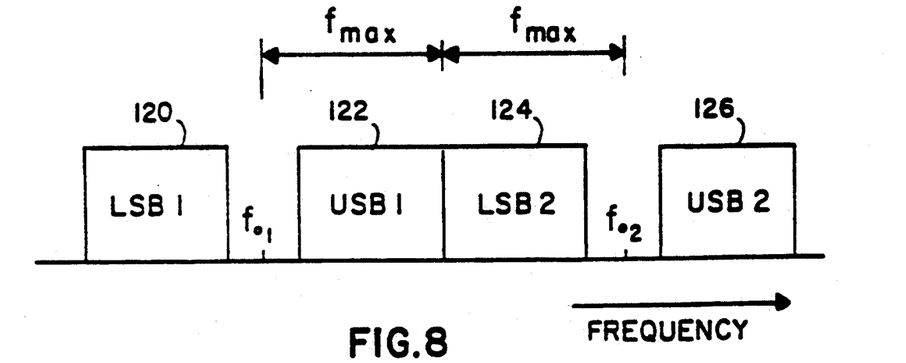
FIG. 8 is a spectral diagram which shows the minimum spacing between optical channels in the optical transmitter of FIG. 3.

The spectral spacing that can be achieved with the optical transmitter of in FIG. 3 is illustrated in FIG. 8. A first optical channel includes a lower sideband 120 and an upper sideband 122. A second optical channel includes a lower sideband 124 and an upper sideband 126. The optical carriers are represented by frequencies $f_{01}$ and $f_{02}$. The second order IMP's have been cancelled using the intermod-cancelling optical phase modulator shown in FIG. 5 or 5A and described above. Thus, adjacent optical channels can be spaced such that the upper sideband 122 of the first optical channel abuts the lower sideband 124 of the second optical channel. This is achieved by a spacing between optical carriers of $2f_{max}$, where $f_{max}$ is the maximum modulation frequency. In practice, it is desirable to provide a slightly greater channel spacing than $2f_{max}$ to allow for nonideal filter characteristics. Nonetheless, the optical transmitter shown in FIGS. 3–6 and described above permits the channel spacing on the order of $2f_{max}$, whereas prior systems required a channel spacing of at least $3f_{max}$.

Figure 9:
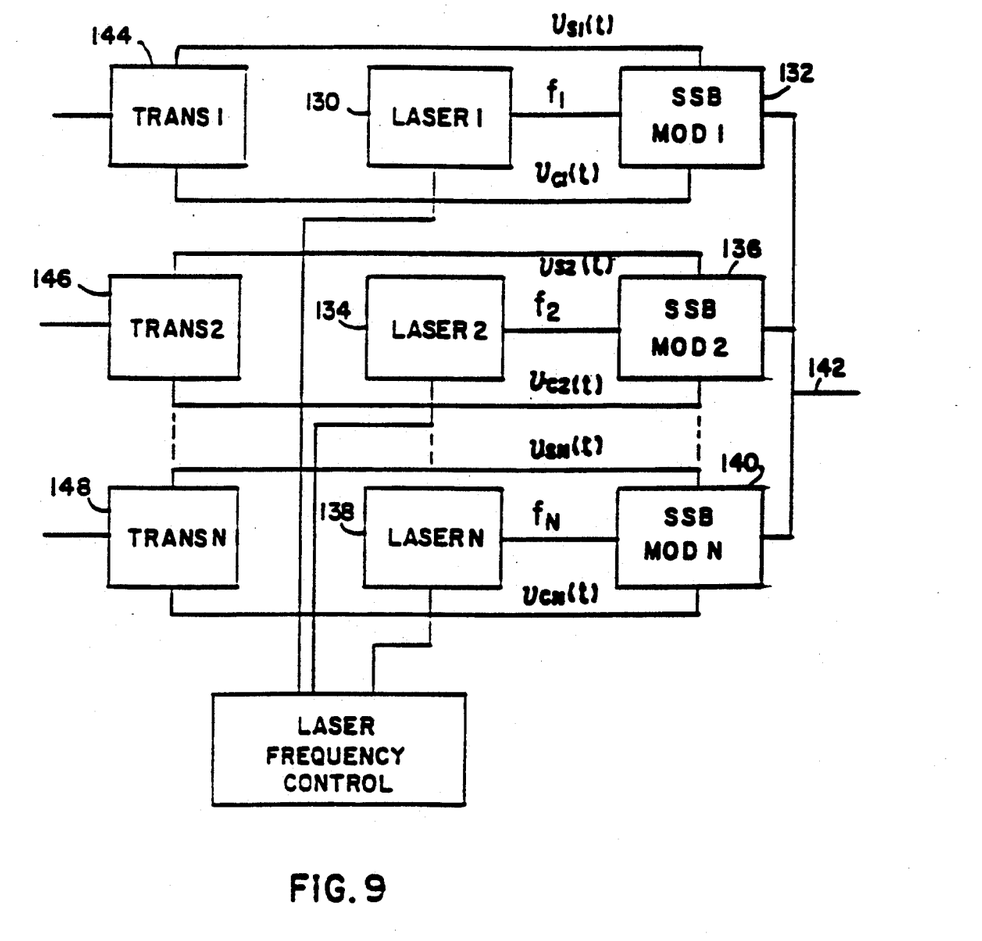
FIG. 9 is a block diagram of an optical transmitter in accordance with the invention, wherein one sideband of each optical channel and second order intermodulation products are cancelled.

An optical transmitter which permits a further reduction in optical channel spacing is shown in FIG. 9. A first laser 130 supplies an optical carrier at a first optical frequency $f_1$ to a first single sideband optical phase modulator 132. A second laser 134 supplies an optical carrier at a second optical frequency $f_2$ to a second single sideband optical phase modulator 136. An Nth laser 138 supplies an optical carrier at an Nth optical frequency $f_N$ to an Nth single sideband optical phase modulator 140. The outputs of modulators 132, 36---140 are connected to an optical fiber 142 which transmits the output of the optical transmitter to one or more remote locations. The modulator 132 receives modulation signals $v_{s1}$ and $v_{c1}$ from an electrical transmitter 144; the modulator 136 receives modulation signals $v_{s2}$ and $v_{c2}$ from an electrical transmitter 146; and the modulator 140 receives modulation signals $v_{s14}$ and $v_{14}$ from an electrical transmitter 148. A laser frequency control 150 supplies control signals to lasers 130, 134---138 for controlling the optical carrier frequencies generated by each of the lasers. The optical transmitter of FIG. 9 includes a laser, a single sideband modulator and an electrical transmitter for each optical carrier. Any desired number N of modulated optical carriers can be transmitted.

Figure 10:
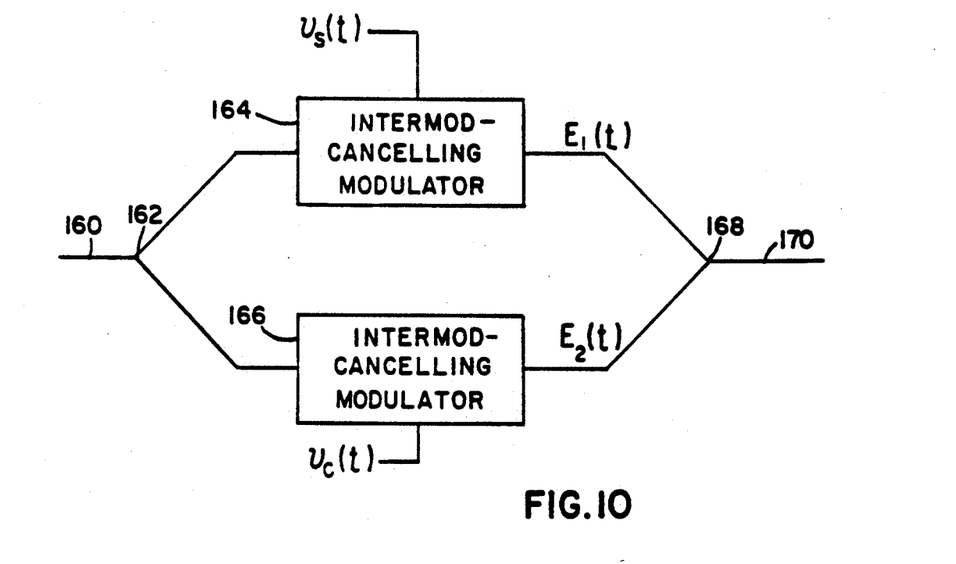
FIG. 10 is a block diagram of a single sideband optical phase modulator used in the optical transmitter of FIG. 9.

A block diagram of a single sideband optical phase modulator representative of the modulator 132, 136---140 is shown in FIG. 10. An input optical waveguide 160 is connected through a an optical divider 162 which coherently couples 50% of an input optical carrier to each of its outputs. One output of optical divider 162 is connected to the input of an intermod-cancelling optical phase modulator 164. The other output of optical divider 162 is connected to the input of an intermod-cancelling optical phase modulator 166. The outputs of intermod-cancelling modulators 164 and 166 are connected by optical waveguides to the respective inputs of an optical combiner 168 which coherently combines the input signals in equal proportions. The optical combiner 168 is connected to an output optical waveguide 170. The intermod-cancelling modulator 164 receives a modulation signal $v_s$, and the intermod-cancelling modulator 166 receives a modulation signal $v_c$.

The intermod-cancelling optical phase modulators 164 and 166 are fabricated as shown in FIG. 5 or 5A and described above. That is, each intermod-cancelling modulator 164 and 166 includes a Mach Zehnder type structure with electrodes 96, 98, 100 (FIG. 5) or 104, 105, 98 (FIG. 5A) and a signal 102 (FIG. 6A) for providing modulation signals the electrodes. In a first embodiment of the invention, the intermod-cancelling modulators 164 and 166 are fabricated on separate substrates, and the interconnecting waveguides comprise polarization-maintaining optical fibers. The optical divider 162 and the optical combiner 168 comprise polarization-maintaining optical fiber couplers. In a second embodiment, the intermod-cancelling modulators 164 and 166 are fabricated on a single substrate, and the interconnecting waveguides are fabricated on the same substrate. Thus, for example, optical waveguides 160 and 167, optical divider 162 and optical combiner 168 can comprise titanium in-diffused regions formed in a lithium niobate substrate.

A modulation voltage $v_s(t)$ applied to modulator 164 is given as follows:

$$v_s(t) = \Sigma \beta_i \sin(\omega_i t + \delta_i) \qquad (6)$$

A modulation voltage $v_c(t)$ applied to modulator 166 is given as follows:

$$v_c(t) = \Sigma \beta_i \cos(\omega_i t + \delta_i) - v_{\#}/2 \qquad (7)$$

where $v_{90/2}$ = a voltage which produces a phase shift of $\pi/2$ at the optical carrier frequency. The optical signal output $E_1(t)$ of modulator 164 is given by:

$$E_1(t) = E_0 \sin(\omega_0 t) \sin\{\Sigma \beta_i \sin(\omega_i t + \delta_i)\} \qquad (8)$$

The optical output signal $E_2(t)$ of modulator 166 is given by:

$$E_2(t) = -E_0 \cos(\omega_0 t) \sin\{\Sigma \beta_i \cos(\omega_i t + \delta_i)\} \qquad (9)$$

The outputs of modulators 164 and 166 as given by equations (8) and (9), respectively, are added coherently in optical combiner 168 to give, to the lowest order in $\beta$, the output optical signal $E_3(t)$ of the single sideband optical phase modulator:

$$E_3(t) = E_0 \Sigma \beta_i \{\cos(\omega_0 t) \cos(\omega_i t + \delta_i) - \sin(\omega_0 t) \sin(\omega_i t + \delta_i)\} \qquad (10)$$

The expression given by equation (10) can be reduced to:

$$E_3(t) = E_0 \Sigma \beta_i \cos(\omega_0 t + \omega_i t + \delta_i) + O(\beta^3) \qquad (11)$$

where $O(\beta^3)$ represents third-order intermodulation products. In the output of the single sideband phase modulator as given by equation (11), the lower sideband and the second order IMP's are cancelled.

Figure 11:
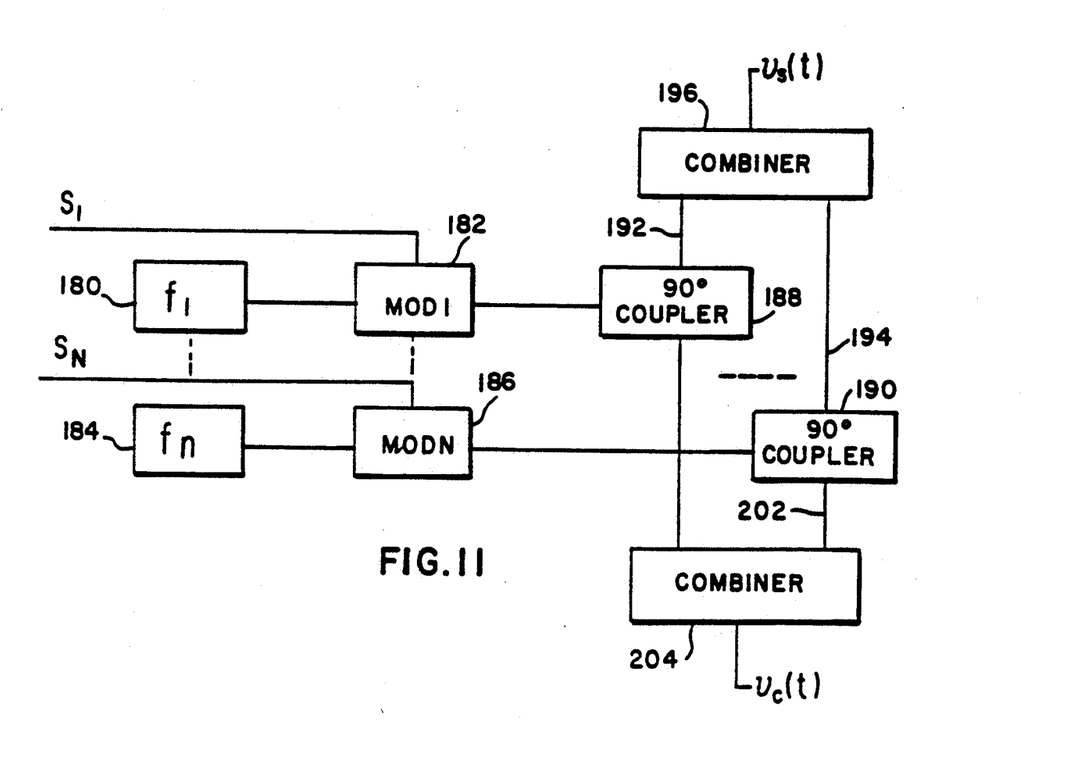
FIG. 11 is a block diagram of an electrical transmitter used in the optical transmitter of FIG. 9.

A block diagram of an electrical transmitter representative of transmitters 144, 146---148 of FIG. 9 is shown in FIG. 11. A source 180 provides a subcarrier at a frequency $f_1$ to a first electrical modulator 182. An Nth source 184 provides a subcarrier at a frequency $f_N$ to an Nth electrical modulator 186. The modulators 182---186 receive information-carrying signals $S_1$---$S_N$, which may be digital or analog. The outputs of modulators 182---186 are connected to 90° couplers 188---190, respectively. An output 192 of coupler 188 and an output 194 of coupler 190 are connected to the inputs of a power combiner 196. The output $v_s(t)$ of combiner 196, as given by equation (6), is connected to one input of the corresponding single sideband phase modulator in the transmitter of FIG. 9. The inputs to combiner 196 on lines 192 and 194 are given by:

$$v_{si}(t) = \beta_i \sin(\omega_i t + \delta_i) \qquad (12)$$

An output 200 of coupler 188 and an output 202 of coupler 190 are connected to the inputs of a power combiner 204. The output $v_c(t)$ of combiner 204, as given by equation (7), is connected to the other input of the corresponding single sideband phase modulator in the optical transmitter of FIG. 9. The inputs to combiner 204 on lines 200 and 202 are given by:

$$v_{ci}(t) = \beta_i \cos(\omega_i t + \delta_i) \qquad (13)$$

While two electrical channels are illustrated in FIG. 11, it will be understood that the transmitter can have any desired number N of channels within the available bandwidth of the single sideband phase modulator.

Figure 12:
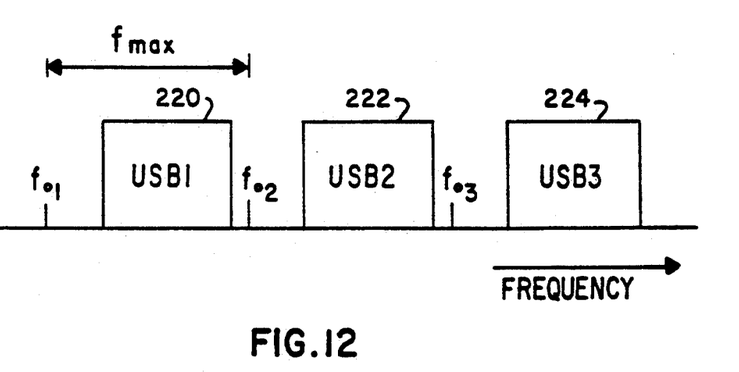
FIG. 12 is a spectral diagram which shows the minimum channel between optical channels in the optical transmitter of FIG. 9.

The spacing of optical channels that can be achieved in the optical transmitter of FIG. 9 is illustrated in FIG. 12. A first optical channel has an upper sideband 220, a second optical channel has an upper sideband 222, and a third optical channel has an upper sideband 224. The corresponding optical carriers are indicated at $f_{01}$, $f_{02}$, and $f_{03}$, respectively. Since the lower sideband and the second order IMP's have been cancelled in each optical channel, the optical carriers can be spaced as close as $f_{max}$. In practice, a slightly greater spacing than $f_{max}$ is utilized to allow for nonideal filter characteristics. However, the optical transmitter of FIG. 9 provides very high spectral efficiency in SCM optical communication systems utilizing multiple optical carriers.

In the optical transmitter of FIG. 9, the lasers 130, 134—138 can each be a distributed feedback semiconductor laser, a diode pumped YAG laser, an external cavity semiconductor laser or any other type of coherent optical signal source.

In the single sideband phase modulator illustrated in FIG. 10, the optical divider 162 for dividing the optical beam can be a polarization preserving 3dB splitter such as a planar waveguide splitter or a biconic fiber coupler made to preserve polarization. The outputs of the intermod-cancelling modulators 164 and 166 must be coupled together by a polarization preserving coupler in order to match the polarizations of the two beams that are being combined. The optical phase must be controlled to insure that the outputs of modulators 164 and 166 are combined with phases as required by equations (8)-(10). As indicated above, the modulators 164 and 166, the optical divider 162 and the optical combiner 168 can be monolithically integrated on a single substrate.

The optical transmitter of FIG. 9 wherein one of the sidebands and the second order IMP's are cancelled has been described in connection with a subcarrier multiplexed optical system in which the subcarriers are typically in the microwave range. However, the single sideband phase modulator described herein is not limited to microwave modulation of the optical carrier. The single sideband phase modulator can be used for any modulation frequency range, within the 3dB bandwidth of the modulator, which does not include a DC component. Thus, the single sideband modulator can be applied to baseband systems, provided a line coding technique such as Manchester encoding, 5B6B encoding or the like, which eliminates the DC component of the signal spectrum, is utilized. Furthermore, the single sideband phase modulator described above can be used to cancel either the upper sideband or the lower sideband.

Figure 13:
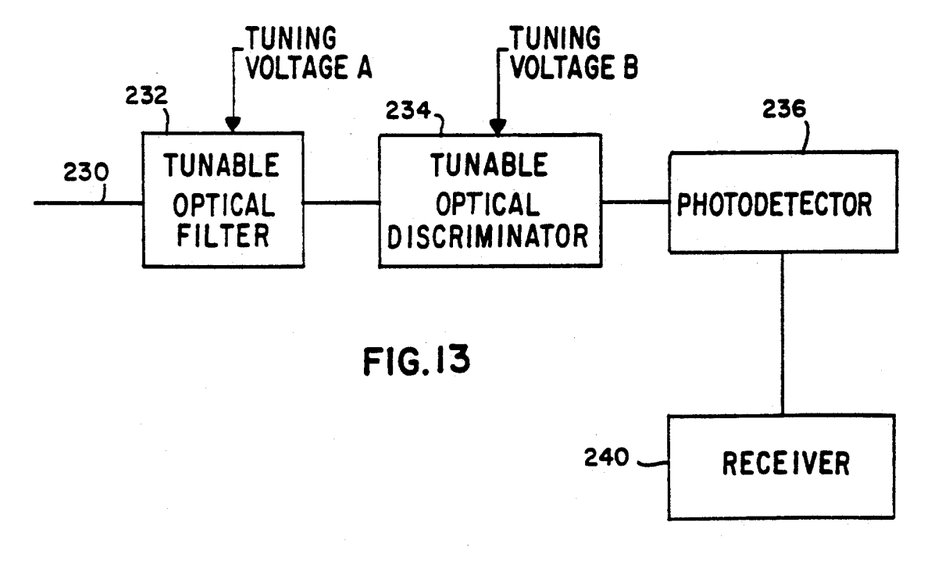
FIG. 13 is a block diagram of a direct detection optical receiver suitable for receiving phase modulated optical signals as generated by the optical transmitters of FIGS. 3 and 9.

A direct detection optical receiver suitable for receiving a single sideband phase modulated optical signal is shown in FIG. 13. The optical signal received on optical fiber 230 passes through a tunable optical filter 232 to a tunable optical discriminator 234. The output of discriminator 234 is connected to a photodetector 236, and the detected signal is connected to an electrical receiver 240. The photodetector 236 corresponds to the photodetector 114 shown in FIG. 7, and the receiver 240 corresponds to receiver 116. The optical filter 232 and the optical discriminator 234 can each be implemented as a tunable Mach Zehnder as disclosed by N. Takato et al in "Silica-Based Integrated Optic Mach Zehnder Multi-Demultiplexer Family With Channel Spacing of 0.01-250 nm", *IEEE Journal of Selected Areas of Communication*, Vol. 8, pages 1120-1127 (1990) or as a tunable Fabry-Perot filter as disclosed by J. Stone et al in "Pigtailed High Finesse Tunable Fiber Fabry-Perot Interferometers With Large, Medium and Small Free Spectral Ranges", *Electronics Letters*, Vol. 23, pages 781-783 (1987). The optical filter 232 is used to select one of the optical carriers transmitted on fiber 230. The peak of the filter 232 passband is set to the desired optical carrier frequency. The optical discriminator 234 is tuned such that a linearly increasing or decreasing portion of its frequency response corresponds to the desired sideband. The optical discriminator 234 converts a phase modulated optical carrier to an intensity modulated optical carrier.

Figure 14:
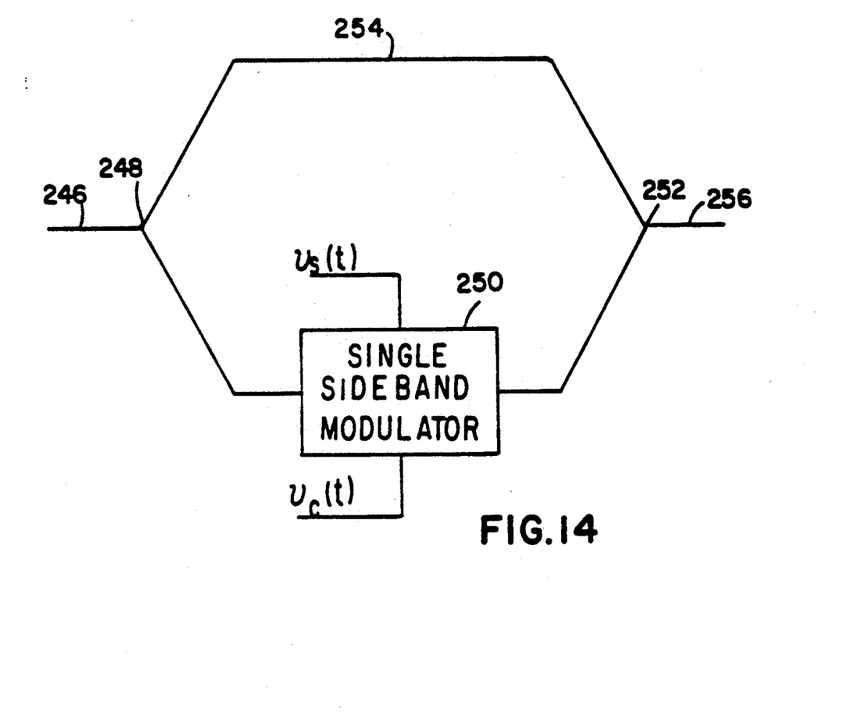
FIG. 14 is a schematic diagram of a single sideband optical intensity modulator in accordance with the invention.

The single sideband modulator shown in FIG. 10 and described above provides phase modulation of the optical carrier. A single sideband optical intensity modulator is shown in FIG. 14. An input optical waveguide 246 is connected to polarization-preserving optical divider 248 which provides 3dB phase coherent power division. One output of optical divider 248 is connected through polarization-maintaining optical waveguide to a single sideband optical phase modulator 250. The output of phase modulator 250 is connected to one input of polarization-maintaining optical combiner 252. The other output of optical divider 248 is connected to one end of an optical waveguide section 254. The other end of waveguide section 254 is connected to the other input of polarization-maintaining optical combiner 252. The optical combiner 252 adds its inputs in a phase coherent manner and provides an output on an optical waveguide 256. The single sideband phase modulator 250 is fabricated as shown in FIG. 10 and described hereinabove. The modulation inputs $v_s(t)$ and $v_c(t)$ are provided by a transmitter of the type shown in FIG. 11 and described above. The output of the single sideband intensity modulator on optical waveguide 256 is an intensity modulated optical carrier.

Figure 15:
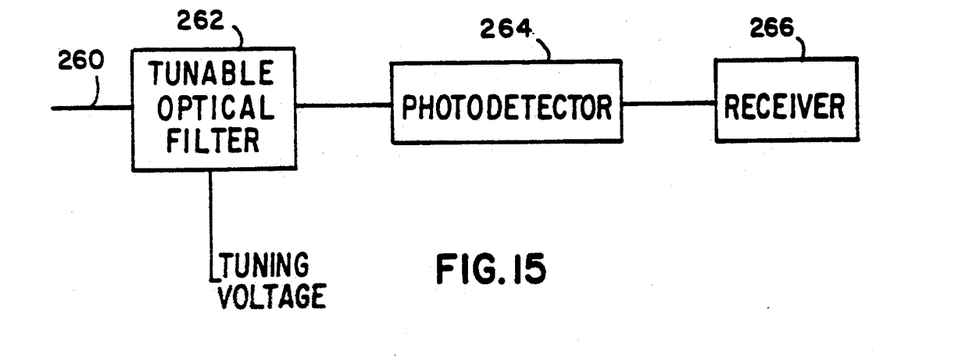
FIG. 15 is a block diagram of a direct detection optical receiver suitable for receiving intensity modulated optical signals as generated by the modulator of FIG. 14.

A direct detection receiver suitable for receiving multiple intensity modulated optical carriers is shown in FIG. 15. The optical signal received on an optical fiber 260 is connected through a tunable optical filter 262 to a photodetector 264. The detected signal is connected to a an electrical receiver 266. The optical receiver shown in FIG. 15 is similar to the receiver shown in FIG. 13 and described above except that the optical discriminator of FIG. 13 is omitted. The tunable optical filter 262 is used to select one of the optical carriers transmitted on optical fiber 260. The intensity modulated optical carrier selected by filter 262 is detected, and the detected signal is provided to receiver 266.

Figure 16:
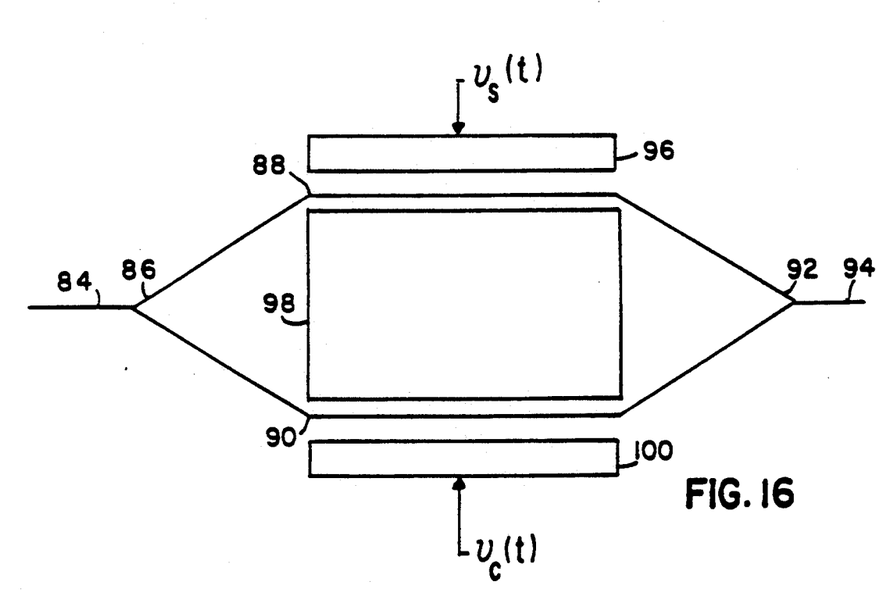
FIG. 16 is a schematic diagram of an intermod-cancelling optical phase modulator used as a single sideband optical phase modulator.

For some applications, it may not be necessary to cancel second-order intermodulation products. In this case, a single sideband optical phase modulator similar to the intermod-cancelling optical phase modulator shown and described above can be used. A schematic diagram of an intermod-cancelling optical modulator modified for use as a single sideband optical modulator is shown in FIG. 16. The optical modulator shown in FIG. 16 corresponds to the optical modulator of FIG. 5, except that the signal conditioner 102 is omitted, and different modulation signals are applied to the electrodes. A modulation voltage $v_s(t)$ as given by equation (6) is applied to electrode 96, and a modulation voltage $v_c(t)$ as given by equation (7) is applied to electrode 100. Alternatively, the traveling wave intermod-cancelling optical modulator of FIG. 5A can be modified and utilized in the same manner. The output of the single sideband optical modulator shown in FIG. 16 is given by:

$$E(t) = E_o\{\cos(\omega_o t)\cos(\phi_s) + \sin(\omega_o t)\cos(\phi_c) + \Sigma \beta_i \cos(\omega_o t + \omega_i t + \delta_i) + O(\beta^3)\} \quad (14)$$

where $\phi_s(t) = \pi\, v_s(t)/v_\pi$, and $\phi_c(t) = \pi\, v_c(t)/v_\pi$.

The first two terms of equation (14) represent second-order (and other even order) intermodulation products. The third term of equation (14) is the desired upper sideband. Thus, a single sideband optical modulator with second-order IMP's present in the output is shown in FIG. 16. This configuration is useful in situations where second-order IMP's are relatively small.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A single sideband polarization-maintaining optical phase modulator comprising:
   a first intermod-cancelling optical phase modulator having an input for receiving an optical carrier and an output for providing a first modulated optical carrier;
   a second intermod-cancelling optical phase modulator having an input for receiving said optical carrier and an output for providing a second modulated optical carrier;
   an input optical divider for coherently coupling said optical carrier to said first and second intermod-cancelling optical phase modulators;
   an output polarization-maintaining optical combiner for coherently combining said first and second modulated optical carriers and providing an output optical signal; and
   modulation means for providing a first modulation signal $v_s(t)$ to said first intermod-cancelling optical phase modulator and for providing a second modulation signal $v_c(t)$ to said second intermod-cancelling optical phase modulator, said first modulation signal and said second modulation signal being selected such that said output optical signal has only a single sideband.

2. A single sideband optical phase modulator as defined in claim 1 wherein said first intermod-cancelling optical phase modulator comprises first and second optical waveguides, first and second electrodes for phase modulating lightwaves carried in said first and second optical waveguides, respectively, a first optical divider for coherently coupling said optical carrier to said first and second optical waveguides, a first optical combiner for coherently combining optical signals from said first and second optical waveguides and providing said first modulated optical carrier, and a signal conditioner responsive to said first modulation signal for providing first and second electrode signals to said first and second electrodes, respectively.

3. A single sideband optical phase modulator as defined in claim 2 wherein said second intermod-cancelling optical phase modulator comprises third and fourth optical waveguides, third and fourth electrodes for phase modulating lightwaves carried in said third and fourth optical waveguides, respectively, a second optical divider for coherently coupling said optical carrier to said third and fourth waveguides, a second optical combiner for coherently combining optical signals from said third and fourth optical waveguides and providing said second modulated optical carrier, and a signal conditioner responsive to said second modulation signal for providing third and fourth electrode signals to said third and fourth electrodes, respectively.

4. A single sideband optical phase modulator as defined in claim 3 wherein said first modulation where i is a positive number denoting one of the plural subcarriers signal having a plurality of subcarriers is of the form $$v_s(t) = \Sigma \beta_i \sin(\omega_i t + \delta_i)$$

where
$\beta_i$ = amplitude of the ith subcarrier,
$\omega_i$ = frequency of the ith subcarrier, and
$\delta_i$ = phase of the ith subcarrier, and said second modulation signal is of the form $$v_c(t) = \Sigma \beta_i \cos(\omega_i t + \delta_i) - v_{\pi/2}$$

where $v_{\pi/2}$ = voltage required to produce a phase shift of $\pi/2$ at the optical carrier frequency.

5. A single sideband optical phase modulator as defined in claim 3 wherein said first, second, third and fourth electrodes comprise lumped-element electrodes.

6. A single sideband optical phase modulator as defined in claim 3 wherein said first, second, third and fourth electrodes comprise traveling wave electrodes.

7. A single sideband optical phase modulator as defined in claim 1 wherein said first and second intermod-cancelling optical phase modulators, said input optical divider and said output optical combiner are fabricated on a single substrate.

8. A single sideband optical phase modulator as defined in claim 7 wherein said substrate comprises lithium niobate.

9. A single sideband optical phase modulator as defined in claim 1 wherein said first intermod-cancelling optical phase modulator is fabricated on a first substrate and said second intermod-cancelling optical phase modulator is fabricated on a second substrate, said input optical divider and said output optical combiner each comprising polarization-maintaining optical fiber coupler.

10. A single sideband optical phase modulator as defined in claim 9 wherein said first and second substrates each comprise lithium niobate.

11. An optical transmitter comprising:
   a plurality of optical signal sources for generating optical signals comprising modulated optical carriers at different optical carrier frequencies, each of said optical signal sources comprising:
      a laser for generating an optical carrier,
      a single sideband optical phase modulator coupled to the output of said laser, and
      modulation means for providing first and second modulation signals to said single sideband modulator for modulating said optical carrier, said first and second modulation signals being selected such that an output optical signal from said single sideband modulator has only a single sideband; and
   means for coupling the output optical signal from each of said optical signal sources to an optical waveguide for transmission, each optical signal having only a single sideband so that said optical carrier frequencies can be closely spaced.

12. An optical transmitter as defined in claim 11 wherein each single sideband optical phase modulator comprises:
   a first intermod-cancelling optical phase modulator having an input for receiving said optical carrier, an output for providing a first modulated optical carrier and a modulation input for receiving said first modulation signal;
   a second intermod-cancelling optical phase modulator having an input for receiving said optical carrier, an output for providing a second modulated optical carrier and a modulation input for receiving said second modulation signal;

input polarization-maintaining optical divider for coherently coupling said optical carrier from said laser to said first and second intermod-cancelling optical phase modulators; and an output polarization-maintaining optical combiner for coherently combining said first and second modulated optical carriers and providing said output optical signal.

13. An optical transmitter as defined in claim 12 wherein said first intermod-cancelling optical phase modulator comprises first and second optical waveguides, first and second electrodes for phase modulating lightwaves carried in said first and second optical waveguides, respectively, a first optical divider for coherently coupling said optical carrier to said first and second optical waveguides, a first optical combiner for coherently combining optical signals from said first and second optical waveguides and providing said first modulated optical signal, and a signal conditioner responsive to said first modulation signal for providing first and second electrode signals to said first and second electrodes, respectively.

14. An optical transmitter as defined in claim 13 wherein said second intermod-cancelling optical phase modulator comprises third and fourth optical waveguides, third and fourth electrodes for phase modulating lightwaves carried in said third and fourth optical waveguides, respectively, a second optical divider for coherently coupling said optical carrier to said third and fourth waveguides, a second optical combiner for coherently combining optical signals from said third and fourth optical waveguides and providing said second modulated optical signal, and a signal conditioner responsive to said second modulation signal for providing third and fourth electrode signals to said third and fourth electrodes, respectively.

15. An optical transmitter as defined in claim 14 wherein said first, second, third and fourth electrodes comprise lumped-element electrodes.

16. An optical transmitter as defined in claim 14 wherein said first, second, third and fourth electrodes comprise traveling wave electrodes.

17. An optical transmitter as defined in claim 12 said first modulation signal having a plurality of subcarrier where 1 is a positive number denoting one of the plural subcarriers is of the form $$v_s(t) = \Sigma \beta_i \sin(\omega_i t + \delta_i)$$

where
$\beta_i$ = amplitude of the ith subcarrier,
$\omega_i$ = frequency of the ith subcarrier, and
$\delta_i$ = phase of the ith subcarrier, and said second modulation signal is of the form $$v_c(t) = \Sigma \beta_i \cos(\omega_i t + \delta_i) - v_{\pi/2}$$

where $v_{\pi/2}$ = voltage required to produce a phase shift of $\pi/2$ at the optical carrier frequency and where either of $\beta_i$, $\omega$ or $\delta_i$ is modulated by an information signal $s_i$.

18. An optical transmitter as defined in claim 17 wherein said modulation means comprises:
a first power combiner for providing said first modulation signal $v_s(t)$;

a second power combiner for providing said second modulation signal $v_c(t)$; and a number N of signal sources for generating signals comprising modulated subcarriers at different subcarrier frequencies, each of said signal sources comprising:

a source for generating a subcarrier, an electrical modulator coupled to the output of said source for modulating said subcarrier in response to an information signal, and a power divider coupled to the output of said electrical modulator for providing to said first combiner a first signal $v_{si}(t)$ of the form $$v_{si}(t) = \beta_i \sin(\omega_i t + \delta_i)$$

and for providing to said second combiner a second signal $v_{ci}(t)$ of the form $$v_{ci}(t) = \beta_i \cos(\omega_i t + \delta_i).$$

19. A single sideband optical intensity modulator comprising:

a single sideband optical phase modulator having an input for receiving an optical carrier and an output for providing a modulated optical carrier;

an optical waveguide section;

an input polarization maintaining optical divider for coherently coupling an input optical carrier to said single sideband optical phase modulator and to an input of said polarization-maintaining optical waveguide section;

an output polarization maintaining optical combiner for coherently combining the output of said single sideband optical phase modulator and the output of said optical waveguide section and providing an output optical signal; and modulation means for providing first and second modulation signals to said single sideband optical phase modulator, said first and second modulation signals being selected such that said modulated optical carrier has only a single sideband.

20. A single sideband optical intensity modulator as defined in claim 19 wherein said single sideband optical phase modulator comprises:

a first intermod-cancelling optical phase modulator having an input for receiving said optical carrier, an output for providing a first modulated optical carrier and a modulation input for receiving said first modulation signal;

a second intermod-cancelling optical phase modulator having an input for receiving said optical carrier, an output for providing a second modulated optical carrier and a modulation input for receiving said second modulation signal;

an input polarization-maintaining optical divider for coherently coupling said optical carrier from said laser to said first and second intermod-cancelling optical phase modulators; and an output combiner for coherently combining said first and second modulated optical carriers and providing said output optical signal.

21. An optical communication system comprising:

an optical transmitter comprising a plurality of optical signal sources for generating optical signals comprising modulated optical carriers at different optical carrier frequencies, each of said optical signal sources comprising:

a laser for generating said optical carrier, a single sideband optical phase modulator coupled to the output of said laser, and modulation means for providing first and second modulation signals to said single sideband modulator for modulating said optical carrier, said first and second modulation signals being selected such that an output optical signal from said single sideband modulator has only a single sideband;

a coherent optical receiver for receiving said optical signals; and an optical waveguide for coupling said optical signals from said optical transmitter to said coherent optical receiver, the outputs of said optical signal sources being coupled to said optical waveguide.

22. A single sideband optical phase modulator comprising:

first and second optical waveguides;

first and second electrodes positioned for phase modulating lightwaves carried in said first and second optical waveguides, respectively;

polarization-maintaining optical divider for coherently coupling an optical carrier to said first and second optical waveguides;

an polarization-maintaining optical combiner for coherently combining modulated optical carriers from said first and second optical waveguides and providing an output optical signal; and modulation means for providing a first modulation signal $v_s(t)$ to said first electrode and for providing a second modulation signal $v_c(t)$ to said second electrode, said first and second modulation signals being selected such that said output optical signal has only a single sideband.

23. A single sideband optical phase modulator as defined in claim 22 wherein said first modulation signal having a plurality of subcarriers where i is a positive number denoting one of the plural subcarriers is of the form $$v_s(t) = \Sigma \, \beta_i \sin(\omega_i t + \delta_i)$$

where $\beta_i$ = amplitude of the ith subcarrier, $\omega_i$ = frequency of the ith subcarrier, and $\delta_i$ = phase of the ith subcarrier, and said second modulation signal is of the form $$v_c(t) = \Sigma \, \beta_i \cos(\omega_i t + \delta_i) - v_{\pi/2}$$

where $v_{\pi/2}$ = voltage required to produce a phase shift of $\pi/2$ at the optical carrier frequency and where either $\beta_i$, $\alpha_i$ or $\delta_i$ is modulated by an information signal $s_i$.

24. A single sideband optical phase modulator as defined in claim 23 wherein said first and second electrodes comprise lumped element electrodes.

25. A single sideband optical phase modulator as defined in claim 23 wherein said first and second electrodes comprise traveling wave electrodes.

* * * * *